Aug. 17, 1937.   J. J. TOMALIS   2,090,338
METHOD OF MAKING SCREW BLANKS
Filed June 16, 1936
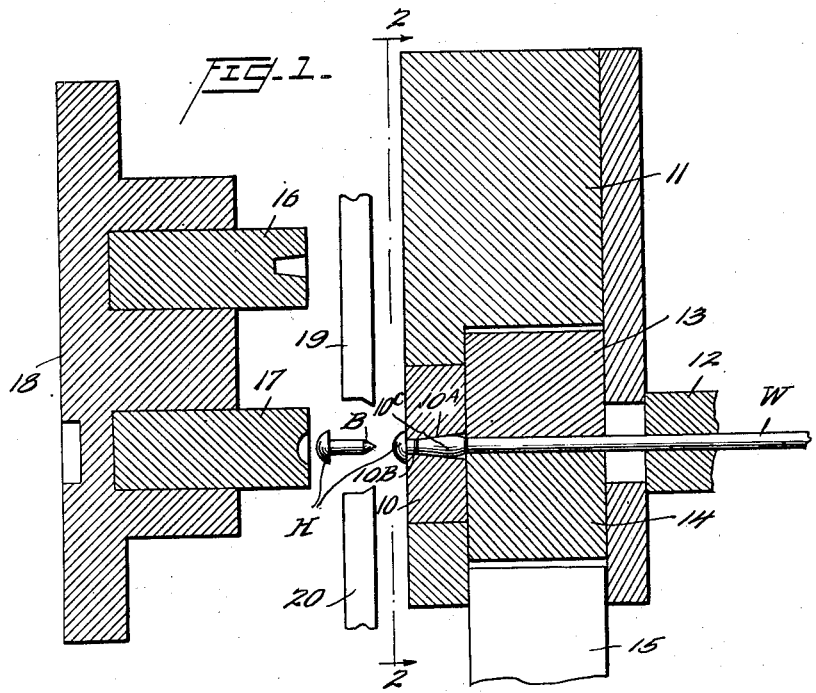
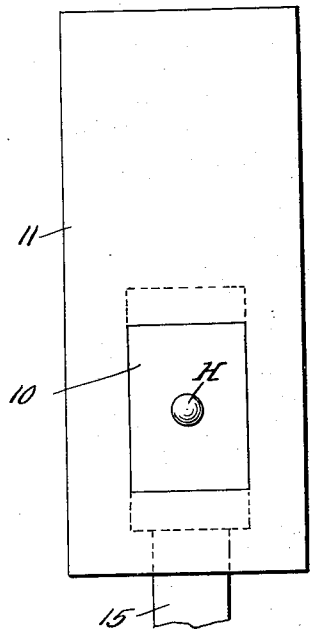
Inventor
Joseph J. Tomalis,
By Watson, Coit, Morse
& Grindle
Attorney Patented Aug. 17, 1937

2,090,338

UNITED STATES PATENT OFFICE 2,090,338

METHOD OF MAKING SCREW BLANKS

Joseph J. Tomalis, Providence, R. I., assignor to American Screw Company, Providence, R. I., a corporation of Rhode Island Application June 16, 1936, Serial No. 85,530

1 Claim. (Cl. 10—27)

This invention relates to the making of screw blanks and particularly blanks adapted for the manufacture of screws of the kind used in fastening together sheets of metal. More specifically, the invention is concerned with a particular form of die for use in forming screw blanks and to the method employed in connection therewith.

The object of the invention is to provide a method and apparatus by which screw blanks can be produced rapidly and economically from a continuous length of wire and with a minimum number of operations, which will avoid the customary operation of shaving the screw head after it is formed and which will produce blanks having shanks of accurate and uniform cylindrical diameter and the exterior surface of which will be smooth and uniform so that such blanks can be easily made into satisfactory screws.

The invention is particularly applicable to the type of screw making machine illustrated in the patent to Rogers 386,091. With machines of that type it has been found that the screw blanks produced thereby do not always have shanks of uniform cylindrical diameter and the surfaces of the shanks are apt to be more or less marred or indented due to the action of the feeding devices and the dies for holding the wire during the heading operation. Such irregularities in the screw blanks are serious and result in defective products, particularly where the blanks are used in the making of sheet metal screws. These difficulties are overcome by the present invention which is illustrated in the accompanying drawing.

In said drawing:

Figure 1 is a longitudinal vertical section through a die embodying the present invention, this view also showing in section certain parts of a screw making machine like that of said prior patent which cooperate with the die;

Figure 2 is a front view on the line 2—2 of Figure 1 looking in the direction of the arrow; and Figure 3 is a detail view illustrating the first step in forming the head of a screw blank.

Except as later pointed out, it is to be understood that the parts illustrated in the accompanying drawing are the same in all substantial respects as corresponding parts in said prior Patent No. 386,091. Since the present invention is concerned only with the die used in forming the screw blanks, the description will be limited to such die and the parts associated therewith. Reference is made to said prior patent for disclosure of a complete machine with which the present invention is adapted to be used. For convenience, the terms "front" and "rear" will be used in the same sense as employed in said patent and these terms will refer respectively to the right and left sides of the die as shown in Figure 1 of the drawing.

In the accompanying drawing, 10 indicates the die to which the present invention relates. This die is made of a solid piece of suitable metal and is rigidly secured in a stationary part of the machine frame indicated at 11, all as set forth in said prior patent. The wire shown at W from which the screw blanks are formed is fed through a stationary guide 12 by feeding mechanism of a suitable character as set forth in said patent, and said mechanism serves to intermittently force the wire through the die 10. The feeding mechanism for each operation advances the wire until the end thereof protrudes beyond the rear side of the die 10. The stationary gripping member 13 and the movable gripping member 14, the latter operated by link 15, serve to grip and hold the wire after each feeding operation and while the protruding end thereof is being upset against the die, to form the head H of the blank. This heading operation is effected by two hammers or dies 16, 17 mounted in a suitable cross-head 18 which as fully set forth in said prior patent is operated to bring the dies 16 and 17 successively in operation against the protruding end of the wire to form a head thereon against the rear face of the die 10. The die 16 partially forms the head as illustrated in Figure 3 and the same is completed by the die 17.

Since the head H is formed against the smooth rear face of the die, it is apparent that the undersurface of the head as well as the top thereof will be smooth and will not contain any projections or fins thereon, so that shaving of the head is rendered unnecessary. The head H may, of course, be made in any shape desired by providing a suitable recess or depression surrounding the rear end of the opening in the die.

After the head is formed on the wire, the gripping members 13, 14 are released and the wire with the head thereon is fed forward through the die 10. The combined pointing and cutting off dies 19, 20 are then operated as described in said patent to simultaneously cut off and point the blank as illustrated at B. After such cutting-off operation, the protruding end of the wire is again upset against the die 10 to form a head thereon and the operation is repeated.

As before noted, when screw blanks are made by the mechanism of said prior patent, the shanks are apt to be more or less distorted or the surfaces thereof made rough and uneven by the action of the feed mechanism and the gripping members which necessarily must firmly seize and hold the wire during the feeding and heading operations. Such marred or distorted blanks cannot be used in making satisfactory screws, particularly where the threads are formed by rolling as is preferably done in the case of sheet metal screws. In other words, if the shank of the screw blank is not exactly cylindrical or if its surface is marred or irregular, it is impossible to roll complete and accurate threads thereon. It has been found that these difficulties can be overcome by forming the opening in the die 10 with a flaring portion as illustrated at 10A in the drawing. Preferably the opening through the die is made cylindrical at and adjacent the rear end thereof as shown at 10B. The flared portion 10A extends from said cylindrical portion 10B to the front or entrance end of the opening. The amount of flare in the portion 10A of the opening is very slight, being only a few thousandths of an inch, and the showing in the drawing is therefore considerably exaggerated in order to clearly illustrate the structure.

A die constructed with a flared opening as described obviates the difficulties mentioned. When the protruding end of the wire is upset against the rear side of the die 10 to form the head, the wire in the flared portion 10A of the opening will be more or less upset or expanded against the flared walls of the opening as illustrated at 10C and it is to be understood that the feed of the wire should be so adjusted as to provide sufficient metal to form the head and to compensate for this slight upsetting or expansion of the wire in the die. The extent of such upsetting or expansion in the die is very slight since, as before noted, the opening is flared only to the extent of a few thousandths of an inch. However, after the wire has been upset or expanded as described and when the next forward feeding operation occurs, the expanded portion 10C of the wire will be forced through the cylindrical part 10B of the opening with the result that the wire is drawn to some extent or reduced to perfect cylindrical form and any roughness or unevenness on the surface thereof will be effectively smoothed out.

The operation is similar to a wire drawing operation and results in blanks which have the shanks thereof smooth and of uniform cylindrical diameter. Furthermore, it has been found that with a solid die having a flared opening as described, less force is required to feed the wire through the die opening than is necessary where such opening is cylindrical from one end to the other as in said prior patent. This result apparently follows from the fact that in a die as described there is less area of contact between the wire and the inner surface of the die than in the other case and as is well known, the resistance offered by a drawing die is proportional to the length of contact. The result is that the gripping and feeding means of said prior patent will function satisfactorily with a solid die having the flared opening as set forth.

As before noted, the heads on the screw blanks are upset against the smooth rear surface of the solid die 10 and consequently such heads are smooth and have no projecting fins or parts thereon so that shaving of the same is unnecessary to form perfect screws.

Having thus described the invention, what is claimed as new and desired to be secured by Letters Patent is:

The method of forming headed screw blanks which comprises forcing a continuous length of wire stock through a flaring opening in a solid die until the end thereof protrudes beyond the rear side of the die in position to be upset against the die by a suitable heading punch, said flaring opening in the die having a cylindrical portion adjacent the rear or exit end thereof and a portion which flares outwardly from said cylindrical portion to the front or entrance end of the opening, holding said wire in the die with its end protruding from the rear side thereof, forcing a heading punch against said protruding end of the wire to upset the same against the rear side of the die to form a head thereon and to simultaneously upset or enlarge the wire in said flared portion of the die opening, and then forcing said wire rearwardly through said cylindrical portion of said opening into position for another heading and upsetting operation.

JOSEPH J. TOMALIS.